(12) United States Patent
Tayshete et al.

(10) Patent No.: US 12,211,505 B2
(45) Date of Patent: Jan. 28, 2025

(54) VOICE COMMAND RESOLUTION METHOD AND APPARATUS BASED ON NON-SPEECH SOUND IN IoT ENVIRONMENT

(71) Applicant: SAMSUNG ELECTRONICS CO., LTD., Suwon-si (KR)

(72) Inventors: Ravibhushan B. Tayshete, Bangalore (IN); Sourabh Tiwari, Bangalore (IN); Vinay Vasanth Patage, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/515,360

(22) Filed: Nov. 21, 2023

(65) Prior Publication Data

US 2024/0087569 A1 Mar. 14, 2024

Related U.S. Application Data

(63) Continuation of application No. 17/164,956, filed on Feb. 2, 2021, now Pat. No. 11,842,732.

(30) Foreign Application Priority Data

Feb. 6, 2020 (IN) .............................. 202041005143
Dec. 24, 2020 (KR) ......................... 10-2020-0183698

(51) Int. Cl.
*G10L 15/22* (2006.01)
*G10L 15/18* (2013.01)
*G10L 15/30* (2013.01)

(52) U.S. Cl.
CPC .............. *G10L 15/22* (2013.01); *G10L 15/18* (2013.01); *G10L 15/30* (2013.01); *G10L 2015/226* (2013.01)

(58) Field of Classification Search
USPC ..................................................... 704/1–504
See application file for complete search history.

(56) References Cited

U.S. PATENT DOCUMENTS 8,326,634 B2 * 12/2012 Di Cristo ............ G06F 16/3329
704/270.1
9,116,962 B1 * 8/2015 Pance ................ G06F 16/24575
9,858,925 B2 * 1/2018 Gruber ................... G10L 15/18
(Continued)

FOREIGN PATENT DOCUMENTS

KR 10-2018-0096483 A 8/2018
KR 10-2019-0106905 A 9/2019
(Continued)

OTHER PUBLICATIONS

International Search Report (PCT/ISA/210) and Written Opinion (PCT/ISA/237) issued by the International Searching Authority in International Application No. PCT/KR2021/001373, issued on May 4, 2021.

*Primary Examiner* — Marcus T Riley
(74) *Attorney, Agent, or Firm* — Sughrue Mion, PLLC

(57) ABSTRACT

A voice command resolution apparatus, including a memory configured to store instructions; and a processor configured to execute the instructions to: recognize a voice command of a user in an input sound, analyze a non-speech sound included in the input sound, and determine at least one target Internet of things (IoT) device related to execution of the voice command, based on an analysis result of the non-speech sound.

20 Claims, 8 Drawing Sheets

(56) References Cited

U.S. PATENT DOCUMENTS

| | | | |
|---|---|---|---|
| 10,283,116 B2* | 5/2019 | Ko | G10L 15/22 |
| 11,842,732 B2* | 12/2023 | Tayshete | G10L 15/22 |
| 2015/0162000 A1 | 6/2015 | Di Censo et al. | |
| 2015/0269937 A1 | 9/2015 | Jitkoff et al. | |
| 2019/0212976 A1* | 7/2019 | Fountaine | G10L 21/06 |
| 2020/0013392 A1 | 1/2020 | Chae | |
| 2020/0020339 A1 | 1/2020 | Chae | |
| 2020/0043476 A1 | 2/2020 | Hwang | |
| 2020/0051554 A1* | 2/2020 | Kim | G06F 3/167 |
| 2020/0219496 A1* | 7/2020 | Kwatra | G10L 15/30 |
| 2021/0074283 A1* | 3/2021 | Park | G10L 15/20 |
| 2021/0249010 A1* | 8/2021 | Tayshete | G10L 15/22 |
| 2024/0087569 A1* | 3/2024 | Tayshete | G10L 15/18 |

FOREIGN PATENT DOCUMENTS

| | | |
|---|---|---|
| KR | 10-2019-0107622 A | 9/2019 |
| KR | 10-2019-0109341 A | 9/2019 |

* cited by examiner

VOICE COMMAND RESOLUTION METHOD AND APPARATUS BASED ON NON-SPEECH SOUND IN IoT ENVIRONMENT

CROSS-REFERENCE TO RELATED APPLICATIONS

This application is a continuation application of U.S. patent application Ser. No. 17/164,956, filed Feb. 2, 2021, which claims the benefit of Indian Patent Application No. 202041005143, filed on Feb. 6, 2020, in the Indian Patent Office and Korean Patent Application No. 10-2020-0183698, filed on Dec. 24, 2020, in the Korean Intellectual Property Office, the disclosures of which are incorporated herein in their entirety by reference.

BACKGROUND

1. Field

The disclosure relates to Internet of things (IoT) devices, and more particularly, to a voice command resolution method and apparatus based on a non-speech sound in an IoT environment.

2. Description of Related Art

With advancement in technology, different types of devices may be interconnected to form a system of devices, which may be called Internet of things (IoT). These devices may be controlled through a user's voice or text input. Voice assistant solutions allow users to perform various tasks such as booking a cab, playing music, and creating alarms through voice or text commands. For an assigned task, a voice assistant responds to a user through a natural language conversation generated via a natural language generator (NLG) module in an IoT system. Currently, the responses of the natural language conversation and the NLG do not consider a surrounding non-speech sound for optimum resolution of a voice command. Also, the voice assistant does not recognize possible actions the user may perform based on surrounding audio scenes and/or activities. When the voice assistant is unable to perform a desired operation for a requested query from the user, the user may feel uncomfortable. For example, if a user is watching television in a living room, multiple background sounds may be present due to IoT devices such as a television, an air conditioner and a robot cleaner. When the user receives a phone call, the user may ask the voice assistant to be quiet to answer the phone call. In this situation, the user may want the IoT devices such as the television, the air conditioner and the robot cleaner to make no sound. However, in reality, because the voice assistant does not consider background non-speech sounds, the voice assistant may instead mute the phone and leave all other sound-making IoT devices active. Additionally, in order to switch to another task, the user needs to explicitly cancel the current conversation.

Artificial intelligence (AI) systems are systems in which machines learn, judge and become smarter, unlike existing rule-based smart systems. As AI systems are used, their recognition rate improves and users' tastes may be understood more accurately, and thus existing rule-based smart systems are gradually being replaced by deep learning-based AI systems. AI technology includes machine learning (e.g., deep learning) and element technologies using machine learning. Machine learning is an algorithm technology that self-classifies/learns characteristics of input data, and element technologies using a machine learning algorithm such as deep learning include technical fields such as linguistic understanding, visual understanding, reasoning/prediction, knowledge representation, and motion control.

SUMMARY

Provided are a voice command resolution method and apparatus based on a non-speech sound in an Internet of things (IoT) environment so as to accurately and efficiently resolve a user's voice command.

Additional aspects will be set forth in part in the description which follows and, in part, will be apparent from the description, or may be learned by practice of the presented embodiments of the disclosure.

In accordance with an aspect of the disclosure, a voice command resolution apparatus includes a memory configured to store instructions; and a processor configured to execute the instructions to: recognize a voice command of a user in an input sound, analyze a non-speech sound included in the input sound, and determine at least one target Internet of things (IoT) device related to execution of the voice command, based on an analysis result of the non-speech sound.

The processor may be further configured to execute the instructions to analyze the non-speech sound when the voice command does not include at least one target IoT device required to execute the voice command.

The processor may be further configured to execute the instructions to determine an operation to be performed by the at least one target IoT device in relation to the execution of the voice command, based on the analysis result of the non-speech sound.

The processor may be further configured to execute the instructions to determine a plurality of target IoT devices related to the execution of the voice command, based on the analysis result of the non-speech sound, determine operations to be performed by the plurality of target IoT devices in relation to the execution of the voice command, based on the analysis result of the non-speech sound, and control the plurality of target IoT devices to simultaneously perform the operations.

The processor may be further configured to execute the instructions to compare the non-speech sound with pre-defined sounds of IoT devices.

The processor may be further configured to execute the instructions to detect an ambient sound that is not related to an operation of an IoT device from the non-speech sound.

The processor may be further configured to execute the instructions to: detect an IoT device control parameter in the voice command, and analyze the non-speech sound based on the IoT device control parameter.

The processor may be further configured to execute the instructions to analyze the non-speech sound based on the IoT device control parameter being detected in the voice command.

The processor may be further configured to execute the instructions to analyze the non-speech sound based on one or more IoT devices pre-matched to the IoT device control parameter.

The processor may be further configured to execute the instructions to determine the at least one target IoT device based on a correlation of at least two of the voice command, the IoT device control parameter, the analysis result of the non-speech sound, or IoT device information received from a repository associated with the voice command resolution apparatus.

The processor may be further configured to execute the instructions to determine the at least one target IoT device based on a correlation between the IoT device control parameter, the analysis result of the non-speech sound, and IoT device information received from a repository associated with the voice command resolution apparatus.

The processor may be further configured to execute the instructions to: determine one or more possible neighboring IoT devices, and analyze the non-speech sound, based on the one or more possible neighboring IoT devices.

The processor may be further configured to execute the instructions to determine the one or more possible neighboring IoT devices based on the non-speech sound.

The processor may be further configured to execute the instructions to determine the one or more possible neighboring IoT devices based on a location of the voice command resolution apparatus.

The processor may be further configured to execute the instructions to determine the location of the voice command resolution apparatus based on the non-speech sound.

The processor may be further configured to execute the instructions to: determine one or more possible neighboring active IoT devices based on a location of the voice command resolution apparatus and IoT device information received from a repository associated with the voice command resolution apparatus, and analyze the non-speech sound, based on the one or more possible neighboring active IoT devices.

The processor may be further configured to execute the instructions to determine one or more active IoT devices that exist around at least one of the voice command resolution apparatus or the user based on the one or more possible neighboring active IoT devices and the non-speech sound.

In accordance with an aspect of the disclosure, an operating method of a voice command resolution apparatus includes recognizing a voice command of a user in an input sound; analyzing a non-speech sound included in the input sound; and determining at least one target Internet of things (IoT) device related to execution of the voice command, based on an analysis result of the non-speech sound.

The operating method may further include detecting an IoT device control parameter in the voice command; and determining one or more possible neighboring IoT devices, wherein the non-speech sound is analyzed based on the IoT device control parameter and the one or more possible neighboring IoT devices.

In accordance with an aspect of the disclosure, a non-transitory computer-readable recording medium having recorded thereon instructions which, when executed by at least one processor, cause the at least one processor to: recognize a voice command of a user in an input sound; analyze a non-speech sound included in the input sound; and determine at least one target Internet of things (IoT) device related to execution of the voice command, based on an analysis result of the non-speech sound.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
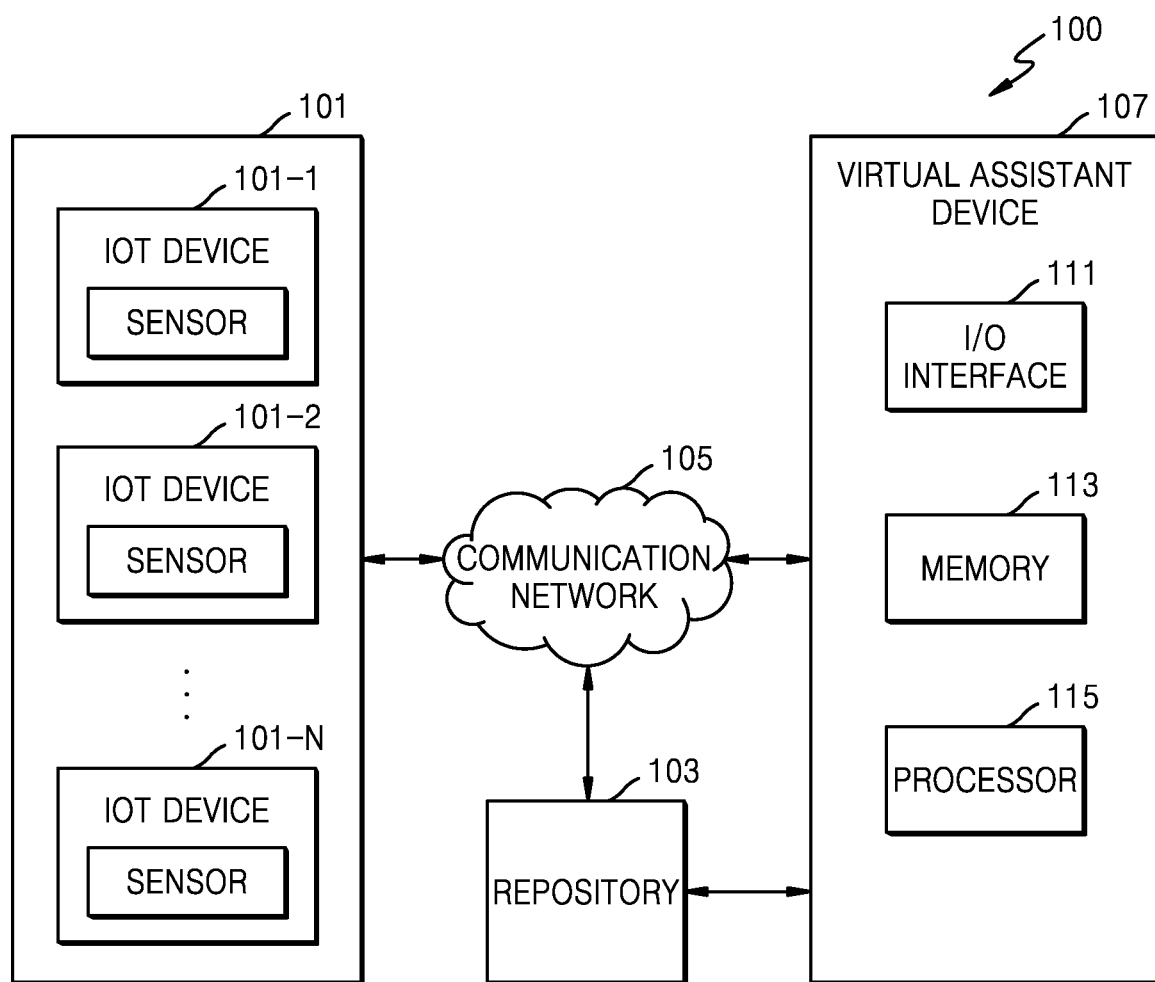
FIG. 1 illustrates an environment for command resolution based on a non-speech sound in an Internet of things (IoT) environment according to an embodiment of the disclosure.

Embodiments of the disclosure will now be described more fully with reference to the accompanying drawings. In the description of the disclosure, certain detailed descriptions of related well-known functions or elements are omitted when it is deemed that they may unnecessarily obscure the essence of the disclosure. In the drawings, elements having substantially the same functions are denoted by the same reference numerals or symbols. For convenience of explanation, an apparatus and method will be described together when necessary. Operations of the disclosure need not necessarily be performed in the described order, and may be performed in parallel, selectively, or individually. Throughout the specification, it will be understood that when an element is referred to as being "connected" to another element, it may be "directly connected" to the other element or "electrically connected" to the other element with intervening elements therebetween.

Throughout the disclosure, the expression "at least one of a, b or c" indicates only a, only b, only c, both a and b, both a and c, both b and c, all of a, b, and c, or variations thereof.

Embodiments of the disclosure relate to a command resolution method and apparatus based on a non-speech sound in an Internet of things (IoT) environment. In an IoT environment, IoT devices may be connected to communicate with one another and perform specific tasks. IoT devices are controlled by using voice or text commands. In the case of voice commands, when a user's voice command is clear, an IoT device may function well to understand the voice command and perform a desired task. However, in situations where a user's voice command is not clear, the voice command is incomplete, or an ambient sound is mixed with the user's voice command, an IoT device may fail to perform a task or deliver an output. In order to overcome such situations, embodiments may control an operation of at least one target IoT device by simultaneously detecting and processing a user's voice command and a non-speech sound from the user's surroundings in the received voice command. Embodiments may operate and deliver a desired task expected by a user from an IoT device even when the user's voice command is not clear, the voice command is incomplete, or an ambient sound is mixed with the voice command.

FIG. 1 illustrates an environment for command resolution based on a non-speech sound in an IoT environment according to an embodiment of the disclosure.

Referring to FIG. 1, an environment 100 includes an IoT device 101-1, an IoT device 101-2, . . . , and an IoT device 101-N, which may collectively be referred as a plurality of IoT devices 101, a repository 103, a communication network 105, and a virtual assistant device 107. The plurality of IoT devices 101 may be connected through the communication network 105 to the virtual assistant device 107. In an embodiment of the disclosure, the plurality of IoT devices 101 may include, but are not limited to, electronic products, electronic devices, or any objects embedded with electronic circuits, sensors, and Internet connectivity. For example, the plurality of IoT devices 101 may be a refrigerator, a chimney, a ventilator, a speaker, a television, an air conditioner, a vacuum cleaner, a mobile phone, a light bulb, and the like. The plurality of IoT devices 101 may run on the universal plug and play (UPnP) protocol. It would be understood by one of ordinary skill in the art that any IoT devices, not mentioned explicitly, may also be used as the IoT devices in the disclosure. Here, all inputs from a user may be received through a user interface of one or more IoT devices or any user device. The plurality of IoT devices 101 may provide real-time output data to the virtual assistant device 107 via the communication network 105, and in turn the plurality of IoT devices 101 may receive a control signal from the virtual assistant device 107 via the communication network 105. The real-time output data may be operating states of the plurality of IoT devices 101. The operating states may include IoT device states of the plurality of IoT devices 101. The communication network 105 may include, but is not limited to, direct interconnection, e-commerce network, peer-to-peer (P2P) network, local area network (LAN), wide area network (WAN), wireless network such as a network using wireless application protocol (WAP), Internet, Wi-Fi, Bluetooth, and the like.

In an embodiment of the disclosure, the virtual assistant device 107 may receive a voice command from the user and may control an operation of at least one target IoT device based on the received voice command. The target IoT device may be an IoT device which the user desires to control through the voice command. The target IoT device may be an IoT device which the user desires to control through the voice command, or an IoT device capable of performing an operation related to execution of the voice command of the user. The voice command may include at least one non-speech sound from the user's surroundings. Here, the voice command may be a speech sound of the user. The virtual assistant device 107 may include an input/output (I/O) interface 111, a memory 113 and a processor 115. The I/O interface 111 may be configured to receive real-time output data from the plurality of IoT devices 101. Likewise, the I/O interface 111 may be configured to transmit a control signal to the plurality of IoT devices 101. The I/O interface 111 may use a communication protocol/method such as Bluetooth, cellular, for example code-division multiple access (CDMA), high-speed packet access (HSPA+), global system for mobile communications (GSM), long-term evolution (LTE), or worldwide interoperability for microwave access (WiMax), or the like. The virtual assistant device 107 may be a part of at least one of the plurality of IoT devices 101.

The voice command received from the user through the I/O interface 111 may be stored in the memory 113. The memory 113 may be communicatively coupled to the processor 115 of the virtual assistant device 107. The memory 113 may also store a processor command. Accordingly, the processor 115 may execute a command for controlling an operation of at least one target IoT device. The memory 113 may include a memory drive, a removable disk drive, or the like. The memory drive may include a drum, a magnetic disk drive, a magneto-optical drive, an optical drive, a redundant array of independent discs (RAID), a solid-state memory device, a solid-state drive, and the like.

The processor 115 may include at least one data processor for controlling an operation of at least one target IoT device. The processor 115 may include specialized processing units such as an integrated system (bus) controller, a memory management control unit, a floating point unit, a graphics processing unit, and a digital signal processing unit.

In an embodiment of the disclosure, the virtual assistant device 107 may exchange data with the repository 103 directly or through the communication network 105. The repository 103 may be a database or a cloud server. Data including at least one of sounds related to operations of the plurality of IoT devices 101, an ambient sound from the user's surroundings, IoT device control parameters, or an association of each IoT device control parameter with one or more IoT devices may be loaded initially or stored during training in the repository 103. The data may include operating states of the plurality of IoT devices 101 that are stored in the repository 103. Here, the operating states of the plurality of IoT devices 101 may be maintained in real time in the repository 103. The sounds related to the operations of the plurality of IoT devices 101 may include, for example, a vibration sound of a washing machine, a sound from a chimney fan, and a refrigerator sound. The ambient sound from the user's surroundings may include, for example, a sound of water from a tap, and a sound of a car engine. The IoT device control parameters may be pre-defined keywords related to one or more IoT device control. The IoT device control parameters may be pre-defined words indicating operations of one or more IoT devices. For example, the IoT device control parameters may include 'speed', 'speed increase/decrease', 'quiet', 'volume', 'volume increase/decrease', 'mute', 'start/stop', 'brightness', 'bright/dark', 'warm/cool', 'open/close', and 'play next/previous'. According to an embodiment of the disclosure, the IoT device control parameters may include at least one of a command, a component type, or a target device. For example, when the user gives a voice command saying 'Reduce speed of chimney', the virtual assistant device 107 may determine that the command is 'reduce speed', the component type is 'IoT' because the chimney is an IoT device, and the target device is 'chimney', when identifying the IoT device control parameters. The association of each IoT device control parameter with one or more IoT devices may include, for example, associating an IoT device control parameter such as speed and speed increase or decrease with an IoT device such as a chimney and/or a ceiling fan. The operating states of the plurality of IoT devices 101 may include current operating states of the plurality of IoT devices 101. For example, when a speaker is turned on and a volume is 5, an operating state of the speaker may be 5. The repository 103 may store a list of the plurality of IoT devices 101. The list may include static IoT devices that are fixed to a location, which may mean for example that the position is fixed, such as a television, a refrigerator, and an air conditioner as well as dynamic IoT devices that are not fixed to any location or movable in nature, which may mean for example that the position is not fixed, such as a mobile terminal/phone and a vacuum cleaner.

The repository 103 may be updated at any time by the virtual assistant device 107, by the user, or by both. The updating may be related to at least one of the sounds related to the operations of the plurality of IoT devices 101, the ambient sound from the user's surroundings, the IoT device control parameters, the association of each IoT device control parameter with one or more IoT devices, or the operating states of the plurality of IoT devices 101.

Figure 2:
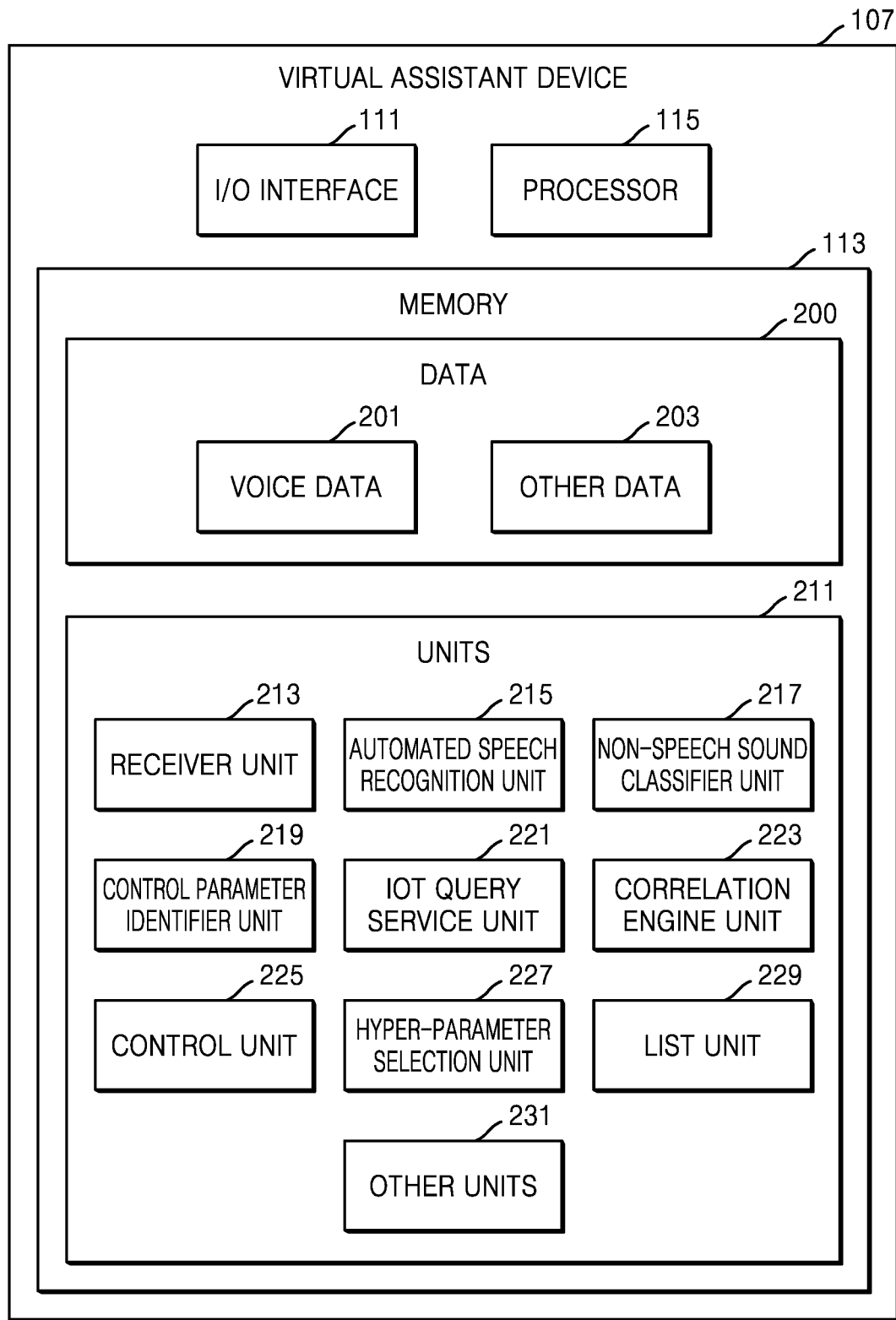
FIG. 2 is a detailed block diagram of a virtual assistant device according to an embodiment.

FIG. 2 is a detailed block diagram of a virtual assistant device according to an embodiment of the disclosure.

The virtual assistant device 107 may include data 200 and one or more units 211, which are described herein in detail, in addition to the I/O interface 111 and processor 115. In an embodiment of the disclosure, the data 200 may be stored in the memory 113. The data 200 may include, for example, voice data 201 and other data 203.

The voice data 201 may be data about an input sound. The input sound may be a sound input through a microphone. The input sound may include a voice command of a user and a non-speech sound. The voice data 201 may include the voice command of the user. The voice data 201 may include at least one non-speech sound from the user's surroundings. The voice command may include at least one non-speech sound from the user's surroundings. The non-speech sound from the user's surroundings may include at least one of sounds related to operations of the plurality of IoT devices 101 in the user's surroundings, or an ambient sound from the user's surroundings other than the sounds related to the operations of the plurality of IoT devices 101. Here, the ambient sound may include a sound of water from a tap, a sound of a car engine during starting or driving, a sound of a pet, a conversation sound of two or more people, and the like.

The other data 203 may store data, including temporary data and temporary files, generated by the units 211 for performing various functions of the virtual assistant device 107.

In an embodiment of the disclosure, the data 200 in the memory 113 are processed by the one or more units 211 present in the memory 113 of the virtual assistant device 107. In an embodiment of the disclosure, the one or more units 211 may be implemented as dedicated hardware units. For example, the term 'unit' may refer to an application-specific integrated circuit (ASIC), an electronic circuit, a field-programmable gate array (FPGA), a programmable system-on-chip (PSoC), a combinational logic circuit, and/or other suitable components that provide the described functionality. In an embodiment of the disclosure, the one or more units 211 may be communicatively coupled to the processor 115 to perform one or more functions of the virtual assistant device 107. The units 211 configured with the functionality defined in the disclosure may be novel hardware. In addition, the term 'unit' may refer to a unit performing at least one function or operation, and may be realized by hardware, software, or a combination of hardware and software. For example, some or all of at least one of the units 211 may be implemented as software stored in the memory 113 and executed by the processor 115.

In an embodiment of the disclosure, the one or more units 211 may include, but are not limited to, a receiver unit 213, an automated speech recognition unit 215, a non-speech sound classifier unit 217, a control parameter identifier unit 219, an IoT query service unit 221, a correlation engine unit 223, a control unit 225, a hyper-parameter selection unit 227, and a list unit 229. The one or more units 211 may also include other units 231 for performing various other functions of the virtual assistant device 107.

The receiver unit 213 may receive a voice command from the user via the I/O interface 111. The voice command may contain at least one non-speech sound from the user's surroundings. The voice command of the user may be a speech sound. The non-speech sound from the user's surroundings may include at least one of sounds related to operations of the plurality of IoT devices 101 in the user's surroundings or an ambient sound from the user's surroundings other than the sounds related to the operations of the plurality of IoT devices 101. For example, when the user says 'reduce speed', the receiver unit 213 may receive 'reduce speed' as a voice command along with an ambient sound from a refrigerator and a chimney fan from the user's surroundings.

The automated speech recognition unit 215 may detect a voice command of the user. The automated speech recognition unit 215 may use any speech recognition technology such as automated speech recognition (ASR) technology or speech to text (STT) technology to detect the voice command of the user. After detection, the automated speech recognition unit 215 may provide user command hypothesis by performing a speech-to-text operation. The output, for example the user command hypothesis of the automated speech recognition unit 215, may be in a text format. For example, the automated speech recognition unit 215 may process the voice command for user command recognition. For example, when the user says 'reduce speed', the receiver unit 213 may receive 'reduce speed' as a voice command along with an ambient sound from a refrigerator and a chimney fan from the user's surroundings. The automated speech recognition unit 215 may detect only the voice command of the user, i.e., 'reduce speed'. In the above example of 'reduce speed', the voice command of the user may be an incomplete speech command because the voice command does not mention at least one target IoT device.

The non-speech sound classifier unit 217 may be trained with non-speech data from various IoT devices and an ambient sound from the user's surroundings other than the non-speech data from the various IoT devices for effective IoT device type detection. The non-speech sound classifier unit 217 may detect at least one non-speech sound from the user's surroundings in a voice command. The non-speech sound classifier unit 217 may apply sound processing technology to extract log mel features such as mel-frequency cepstral coefficients (MFCCs) from the voice command, and then may detect the non-speech data by using a convolutional neural network (CNN) algorithm for the log mel features. The above detection method is merely an example. Non-speech sound classification is not limited to the MFCC-based CNN algorithm. After detection, the non-speech sound classifier unit 217 may classify the non-speech sound to recognize one or more appropriate IoT devices. Also, the non-speech sound classifier unit 217 may detect a location where the voice command of the user is detected and may use the detected location to recognize one or more appropriate IoT devices. For example, the non-speech sound classifier unit 217 may process the non-speech sound to recognize relevant IoT devices. For example, when the user says 'reduce speed', the receiver unit 213 may receive 'reduce speed' as a voice command along with an ambient sound from a refrigerator and a chimney fan from the user's surroundings. The non-speech sound classifier unit 217 may detect the ambient sound other than sounds related to operations of IoT devices. The non-speech sound classifier unit 217 may detect only the ambient sound from the refrigerator and the chimney fan and may recognize the refrigerator and the chimney fan as appropriate IoT devices.

The automated speech recognition unit 215 and the non-speech sound classifier unit 217 may process respective data of a received voice command in parallel. For example, the received voice command may be provided to the automated speech recognition unit 215 and the non-speech sound classifier unit 217 at the same time for parallel processing.

The control parameter identifier unit 219 may receive user command hypothesis from the automated speech recognition unit 215, and may identify one or more IoT device control parameters in the user command hypothesis. The control parameter identifier unit 219 may be a part of a natural language processing (NLP) system. For example, the control parameter identifier unit 219 may process a voice command of the user by using NLP technology such as sentence segmentation, tokenization, part-of-speech tagging, and entity recognition to identify the IoT device control parameters. For example, in the voice command of the user, i.e., 'reduce speed', the control parameter identifier unit 219 may identify 'reduce' and 'speed' as control parameters.

The IoT query service unit 221 may receive one or more pieces of IoT device information recognized by the non-speech sound classifier unit 217. Based on the recognized IoT device information, the IoT query service unit 221 may obtain operating states of corresponding IoT devices. The operating states may include IoT device states. The IoT device state may mean that the IoT device is turned on or turned off, and the operating state of the IoT device may mean an operation mode. For example, a chimney fan may operate at a fan speed of 4, out of possible fan speeds of 1 to 5. The IoT query service unit 221 may obtain operating states by querying the IoT devices directly or by querying the repository 103, which stores operating states of all available IoT devices in real time. For example, once a refrigerator and a chimney fan are recognized as appropriate IoT devices by the non-speech sound classifier unit 217, the IoT query service unit 221 may obtain operating states of the refrigerator as 'OFF' and the chimney fan as 'ON' and '4' from the repository 103.

The correlation engine unit 223 may receive IoT device control parameters from the control parameter identifier unit 219, and operating states of one or more IoT devices from the IoT query service unit 221. The correlation engine unit 223 may receive a voice command from the automated speech recognition unit 215. The correlation engine unit 223 may receive a non-speech sound classification result from the non-speech sound classifier unit 217. The correlation engine unit 223 may identify a correlation of at least two of the voice command, the non-speech sound classification result, the operating states of the one or more IoT devices, or the IoT device control parameters. The correlation engine unit 223 may identify a correlation between the operating states of the one or more IoT devices and the IoT device control parameters. The correlation engine unit 223 may identify a correlation between the non-speech sound classification result, the operating states of the one or more IoT devices, and the IoT device control parameters. Next, the correlation engine unit 223 may select at least one target IoT device from among the one or more IoT devices based on the correlation. For example, when receiving operating states of a refrigerator as 'OFF' and a chimney fan as 'ON' and '4' from the IoT query service unit 221 and control parameters as 'reduce' and 'speed' from the control parameter identifier unit 219, the correlation engine unit 223 may determine that 'speed' is related to the chimney fan. In this case, because the refrigerator is in an 'OFF' state, the correlation engine unit 223 unit may not consider the refrigerator. The correlation engine unit 223 may be a part of an NLP system.

The virtual assistant device 107 may include a multiple context loader unit and an intent resolver and response generator unit, in addition to the correlation engine unit 223.

The multiple context loader unit may receive at least one target IoT device selected from the correlation engine unit 223 or in a candidate list. The multiple context loader unit may load a concurrent context stack for each of the selected IoT devices for user command matching. The multiple context loader unit may hold a current operating state of each of the selected IoT devices for accurate user command determination. The multiple context loader unit may be a part of an NLP system. For example, when IoT devices such as a television, an air conditioner, and a vacuum cleaner are selected by the correlation engine unit 223, the multiple context loader unit may load contexts of the selected IoT devices into the NLP system.

The intent resolver and response generator unit may resolve a user command intent to one or more most appropriate IoT devices. The intent resolver and response generator unit may generate a response for performing a desired task by specifying tasks of IoT devices. The intent resolver and response generator unit may be a part of an NLP system. For example, consider a situation in which the user issues a command "Hi Bixby! Silence please. I have to answer the phone". There may be multiple IoT devices such as a light bulb and a doorknob in addition to a television, an air conditioner, and a vacuum cleaner that are confirmed to operate in the vicinity of the user command. In this situation, the intent resolver and response generator unit may resolve the user command request of "silence" only to devices that may produce loud noise such as the television, the air conditioner, and the vacuum cleaner. The control unit 225 may perform an operation of controlling an operation of at least one selected target IoT device received from the correlation engine unit 223. For example, when a user command is to 'mute a device' and the correlation engine provides at least one target IoT device such as a television, an air conditioner, and a vacuum cleaner along with their operating states 'ON', 'FAN ON', and 'ON', respectively, the control unit 225 may mute the television, turn off of the fan of the air conditioner, and turn off the vacuum cleaner.

The hyper-parameter selection unit 227 may secure an IoT device list by determining a location and/or position of the virtual assistant device 107 according to whether the virtual assistant device 107 is fixed or movable. For example, there are two categories of IoT devices. One category involves dynamic/movable IoT devices in the house such as a mobile terminal and a vacuum cleaner, and other category involves fixed/static IoT devices in the house such a speaker, a television, and a refrigerator. When the virtual assistant device 107 that is a part of an IoT device is fixed, the hyper-parameter selection unit 227 may know a location of the IoT device and may obtain IoT devices that may be used in the room/scene in the house. When the virtual assistant device 107 that is a part of an IoT device is movable, the hyper-parameter selection unit 227 may check a position of the IoT device. When the hyper-parameter selection unit 227 may know the position of the IoT device, the hyper-parameter selection unit 227 may obtain IoT devices that may be used in the room/scene in the house. When the hyper-parameter selection unit 227 may not know the position of the IoT device, the hyper-parameter selection unit 227 may obtain all IoT devices that may be used in the house. In order to generate or secure one or more appropriate IoT devices, the IoT device list may be provided from the hyper-parameter selection unit 227 to the non-speech sound classifier unit 217.

Figure 3:
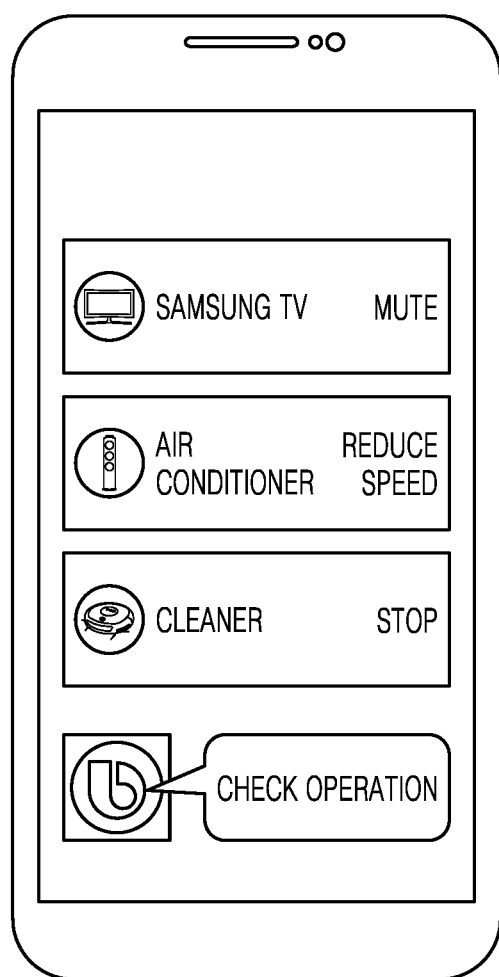
FIG. 3 is a view illustrating a list of target IoT devices on a user interface of an electronic device associated with a user according to an embodiment.

The list unit 229 may receive an output of the correlation engine unit 223 in a situation in which the correlation engine unit 223 selects one or more target IoT devices. The list unit 229 may provide a list including target IoT devices to the user for user selection via an electronic device related to the user, as shown in FIG. 3. For example, the list may include target IoT devices such as SAMSUNG television (TV), air conditioner, and cleaner, which may be included in the plurality of IoT devices 101.

Figure 4A:
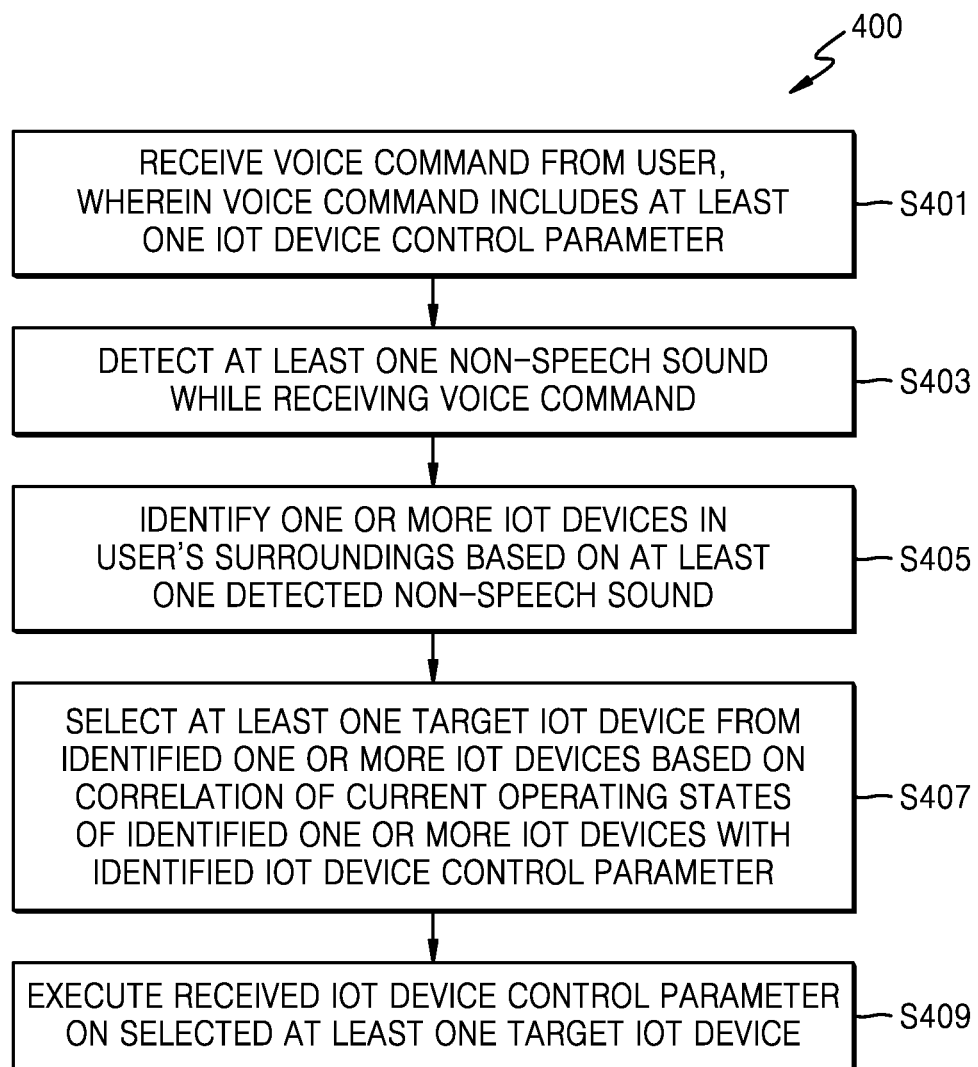
FIG. 4A is a flowchart illustrating a command resolution method based on a non-speech sound in an IoT environment according to an embodiment.
Figure 4B:
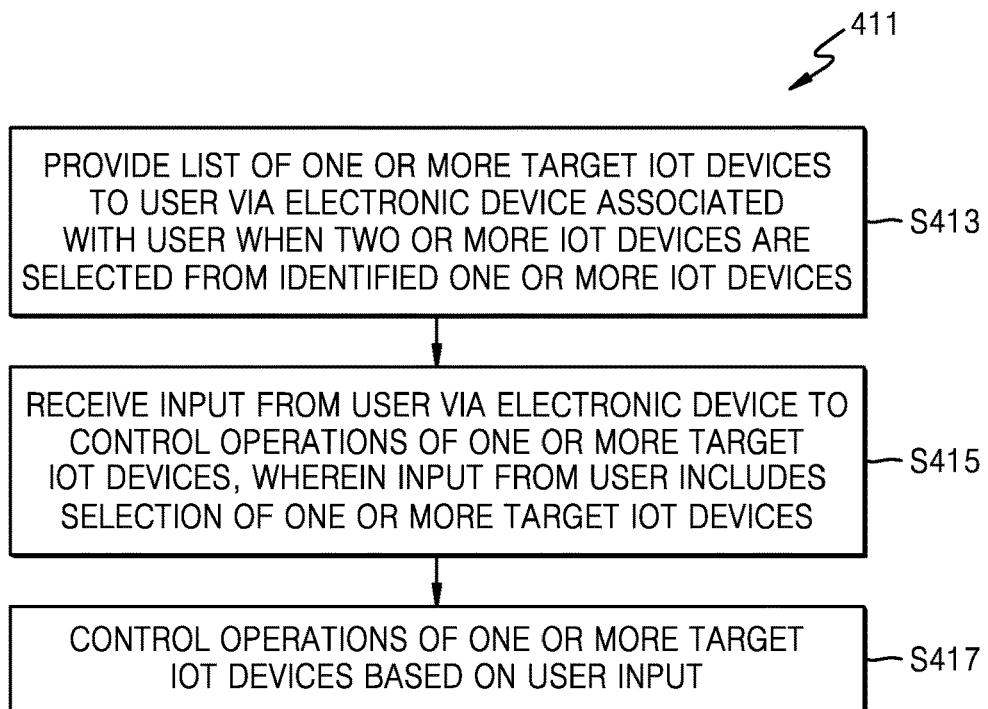
FIG. 4B is a flowchart illustrating a command resolution method based on a non-speech sound in an IoT environment according to an embodiment.

FIGS. 4A and 4B are flowcharts illustrating a command resolution method based on a non-speech sound in an IoT environment according to an embodiment of the disclosure.

Referring to FIGS. 4A and 4B, the command resolution method 400 may include one or more operations for command resolution based on a non-speech sound in an IoT environment, and may be described in the general context of computer-executable instructions. Generally, computer-executable instructions may include routines, programs, objects, components, data structures, procedures, units, and functions, which perform particular functions or implement particular abstract data types.

The order in which operations of the command resolution method 400 are described is not intended to be construed as a limitation, and any number of the described operations may be combined in any order to implement the command resolution method 400. Additionally, individual operations may be omitted from the command resolution method 400 without departing from the scope of the subject matter described herein. Also, the command resolution method 400 may be implemented in any suitable hardware, software, firmware, or a combination thereof.

In operation S401, a voice command from a user may be received by the receiver unit 213 through the I/O interface 111. The voice command may include at least one IoT device control parameter.

In operation S403, the automated speech recognition unit 215 and the non-speech sound classifier unit 217 may detect the voice command of the user and at least one non-speech sound from the user's surroundings in the received voice command. Analysis of the at least one non-speech sound from the user's surroundings may be triggered according to detection of presence of the at least one IoT device control parameter in the voice command of the user.

The automated speech recognition unit 215 may process the voice command of the user to identify the IoT device control parameter. Here, each IoT device control parameter may be associated with one or more IoT devices. Also, the IoT device control parameter may include at least one of a command, a component type, or a target IoT device.

The processing of the voice command of the user and the analysis of the at least one non-speech sound from the user's surroundings may be performed in parallel.

In operation S405, the non-speech sound classifier unit 217 may identify one or more IoT devices in the user's surroundings based on at least one of the detected non-speech sound or a location where the voice command of the user is detected. The non-speech sound from the user's surroundings may include at least one of sounds related to operations of IoT devices in the user's surroundings or an ambient sound from the user's surroundings other than the sounds related to the operations of the IoT devices. The at least one non-speech sound may be detected from the use's surroundings or from the virtual assistant device 107's surroundings.

In operation S407, the correlation engine unit 223 may select at least one target IoT device from the identified one or more IoT devices based on a correlation of current operating states of each of the identified one or more IoT devices with the identified IoT device control parameter. The operating states of the one or more IoT devices may be received from the IoT query service unit 221, and the IoT device control parameter may be received from the control parameter identifier unit 219.

In operation S409, the control unit 225 may execute the received IoT device control parameter on the selected at least one target IoT device. The control unit 225 may control an operation of the selected at least one target IoT device to achieve command resolution based on the non-speech sound.

Control method 411, which may be include operations S413 through S417 of FIG. 4B, may be performed when two or more target IoT devices are selected by the correlation engine unit 223.

In operation S413, the list unit 229 may provide a list of at least one target IoT device to the user via an electronic device related to the user. The list may be provided when two or more target IoT devices are selected by the correlation engine unit 223 from the identified one or more IoT devices.

In operation S415, the receiver unit 213 may receive an input from the user via the electronic device to control an operation of the at least one target IoT device. The input from the user may include a selection of the at least one target IoT device. The electronic device may include a mobile terminal, a speaker, a television, a refrigerator, a washing machine, a chimney, or any other IoT-enabled devices.

In operation S417, the control unit 225 may control an operation of the at least one target IoT device based on the user input.

Figure 5:
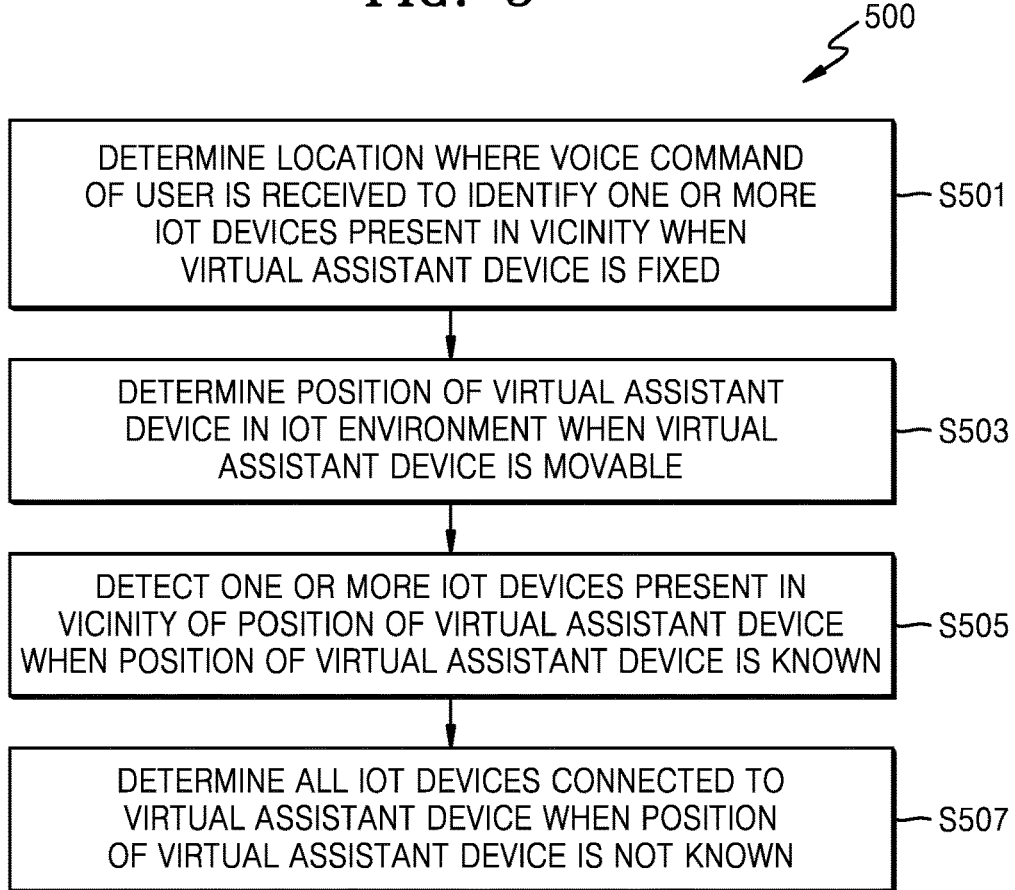
FIG. 5 is a flowchart illustrating a method of securing a list of IoT devices having a correlation to a non-speech sound according to an embodiment.

FIG. 5 is a flowchart illustrating a method of securing a list of IoT devices with a correlation to a non-speech sound according to an embodiment of the disclosure.

As shown in FIG. 5, a method 500 of securing a list according to an embodiment of the disclosure may include one or more operations for securing a list of IoT devices with a correlation to a non-speech sound, and may be described in the general context of computer-executable instructions. Generally, computer-executable instructions may include routines, programs, objects, components, data structures, procedures, units, and functions, which perform particular functions or implement particular abstract data types.

The order in which operations of the method 500 are described is not intended to be construed as a limitation, and any number of the described operations may be combined in any order to implement the method 500. Additionally, individual operations may be omitted from the method 500 without departing from the scope of the subject matter described herein. Also, the method 500 may be implemented in any suitable hardware, software, firmware, or a combination thereof.

In operation S501, the hyper-parameter selection unit 227 may determine a location where a voice command of a user is received, to identify one or more IoT devices present in the vicinity of the location. The IoT devices may be categorized into two sets: (i) static IoT devices that are not moving or fixed to a location such as a television, a washing machine, and a refrigerator and (ii) dynamic IoT devices that are moving or not fixed to any location such as a mobile terminal and a vacuum cleaner in the house. Locations of the static IoT devices may be stored in the repository 103. This operation may be performed when the virtual assistant device 107 is fixed, i.e., non-movable. For example, when the virtual assistant device 107 is a fixed device such as a speaker, a television, or a refrigerator, the virtual assistant device 107 may know locations of IoT devices from the repository 103 and may obtain available IoT devices in that room/scene.

In operation S503, the hyper-parameter selection unit 227 may determine a position of the virtual assistant device 107 in an IoT environment. This operation may be performed when the virtual assistant device 107 is dynamic, i.e., movable. For example, when the virtual assistant device 107 is a dynamic device such as a mobile terminal or a vacuum cleaner, the virtual assistant device 107 may determine its position in that room/scene. The IoT query service unit 221 may assist the hyper-parameter selection unit 227 to determine the position. In an embodiment of the disclosure, the position may be determined based on any specific identified IoT device, a combination of an IoT device with a known location, or an IoT scene. For example, during user command processing, the non-speech sound classifier unit 217 may identify that a television is turned on with the help of the IoT query service unit 221. This confirms that the virtual assistant device 107 is potentially at the same location as a location of the television. As another example, during user command processing, the non-speech sound classifier unit 217 may identify the presence of two or more IoT devices belonging to the same IoT scene with the help of the IoT query service unit 221. For example, sounds of a refrigerator and a chimney are identified in the same IoT scene. This potentially means that the virtual assistant device 107 is, also, in the same IoT scene. In this case, the scene is 'Kitchen IoT scene'.

In operation S505, the hyper-parameter selection unit 227 may determine one or more IoT devices present in the vicinity of the position of the virtual assistant device 107. This operation is performed when the position of the virtual assistant device 107 is known. For example, when the position of the virtual assistant device 107 is known, the virtual assistant device 107 may obtain a list of available IoT devices in that room/scene. In this situation, the IoT query service unit 221 may provide a list of available IoT devices in the same position or IoT scene along with each IoT device states to the virtual assistant device 107. One way to achieve this is for the user to create an IoT room/scene and add one or more non-movable IoT devices to that room/scene. When the virtual assistant device 107 is a movable device, the room/scene of the virtual assistant device 107 may also be identified as soon as a sound of a nearest fixed IoT device is detected.

In operation S507, the hyper-parameter selection unit 227 may determine all IoT devices connected to the virtual assistant device 107 when the position of the virtual assistant device 107 is not known. Information on the all IoT devices connected to the virtual assistant device 107 may be obtained from the repository 103, which stores a list of a plurality of IoT devices 101, which may include both static and dynamic IoT devices. For example, when the position of the virtual assistant device 107 is not known, the virtual assistant device 107 may obtain all available static and dynamic IoT devices in the house.

Information from operation S501 to operation S507 may be provided from the hyper-parameter selection unit 227 to the non-speech sound classifier unit 217 to generate or secure one or more appropriate IoT devices.

Some examples are presented below based on FIGS. 4A, 4B, and 5.

Example 1: Consider a scenario in a kitchen where a user is listening to a recipe on an electronic device. The user is unable to listen to the recipe due to a surrounding or ambient sound of a refrigerator and a chimney fan. In order to listen to the recipe clearly, the user gives a command "Hi Bixby! Can't hear you. Reduce speed." The virtual assistant device 107 identifies non-speech data, i.e., sounds of the refrigerator and the chimney fan. The virtual assistant device 107 further identifies that reducing speed relates to the chimney fan, not to the refrigerator, from among the refrigerator and the chimney fan, and reduces a speed of the chimney fan. The user now listens to the recipe without any sound from the chimney fan. This example relates to a situation in which a single device, i.e., the chimney fan, is controlled based on multiple unique non-speech data, i.e., an ambient sound of the refrigerator and the chimney fan.

Example 2: Consider a scenario in a living room where a user receives a phone call on his or her mobile phone. A vacuum cleaner, a television, and an air conditioner are operating in the living room. In order to make the phone call without any interruption, the user gives a command "Hi Bixby! Keep silence. I want to receive the phone call." The virtual assistant device 107 of the disclosure identifies non-speech data, i.e., sounds of the vacuum cleaner, the television, and the air conditioner. The virtual assistant device 107 further identifies keeping silence relates to all the devices in the living room except the ringing phone itself, i.e., the vacuum cleaner, the television, and the air conditioner. In this situation, the virtual assistant device 107 stops the vacuum cleaner, mutes the television, and turns off the fan of the air conditioner. The user now receives the phone call without worrying about any sound from the devices in the living room. This example relates to a situation in which multiple devices, i.e., the vacuum cleaner, the television, and the air conditioner, are controlled based on multiple unique non-speech data, i.e., an ambient sound of the vacuum cleaner, the television, and the air conditioner.

Example 3: Consider a scenario in a kitchen where a user is washing dishes in a sink. In the kitchen, there are lights near the sink and a dish washer. In order to illuminate the kitchen, the user gives a command "Hi Bixby! Turn on this light." The virtual assistant device 107 of the disclosure identifies non-speech data, i.e., sounds of running water and the dish washer. Based on the non-speech data, the virtual assistant device 107 identifies that the location is the kitchen and then identifies that devices in the kitchen are the lights and the dish washer. The virtual assistant device 107 identifies that turning on this light relates to the light near the sink in the kitchen, not to a light in another place. In this situation, the virtual assistant device 107 turns on the light near the sink in the kitchen. This example relates to a situation in which one or more devices, i.e., lights, are controlled based on a location of a non-speech sound, i.e., an ambient sound of the running water and the dish washer. Also, this example relates to a situation in which a device that does not operate or does not make a sound is controlled.

Example 4: Consider a scenario in which a user is driving a car with a sunroof open. In order to make a phone call, the user gives a command "Hi Bixby! Call Jacob." The virtual assistant device 107 of the disclosure identifies non-speech data, i.e., noise outside the car. Based on the non-speech data, the virtual assistant device 107 identifies that the sunroof of the car is open. The virtual assistant device 107 closes the sunroof and makes the phone call to contact Jacob from a phone directory. This example relates to a situation in which one or more devices, i.e., the sunroof of the car, are controlled during a conversation with the virtual assistant device 107. Also, this example relates to a situation in which an IoT device capable of performing an operation related to execution of the voice command of the user, instead of a direct target IoT device of the voice command of the user, is controlled. Also, this example relates to a situation in which when the voice command of the user is complete, that is, when the target IoT device of the voice command is specified, an IoT device capable of performing an operation related to execution of the voice command of the user is controlled.

Example 5: Consider another scenario in a kitchen where a user is listening to a recipe on an electronic device. The user is unable to listen to the recipe due to a surrounding or ambient sound of a refrigerator and a chimney fan. In order to listen to the recipe clearly, the user gives a command "Hi Bixby! Can't hear you. Reduce speed?" The virtual assistant device 107 of the disclosure identifies non-speech data, i.e., sounds of the refrigerator and the chimney fan. The virtual assistant device 107 further identifies that reducing speed relates to the chimney fan, not to the refrigerator, from among the refrigerator and the chimney fan, and asks the user "Do you want me to reduce chimney fan speed?" When receiving the user's voice confirmation, such as "Yes," the virtual assistant device 107 reduces a speed of the chimney fan. The user continues to listen to the recipe without any sound from the chimney fan. This example relates to a situation in which a single device, i.e., the chimney fan, is controlled after confirmation from the user (without receiving confirmation via a user interface of the electronic device).

Example 6: Consider a scenario in a bedroom where a user is trying to put the user's baby to sleep. A vacuum cleaner, a television, and an air conditioner are operating in the bedroom. In order to reduce the sound in the bedroom, the user gives a command "Hi Bixby! Keep silence. My baby is going to sleep." The virtual assistant device 107 of the disclosure identifies non-speech data, i.e., sounds of the vacuum cleaner, the television, and the air conditioner. The virtual assistant device 107 further identifies that keeping silence relates to all the devices in the bedroom, i.e., the vacuum cleaner, the television, and the air conditioner. In this situation, the virtual assistant device 107 provides a list of devices including the vacuum cleaner, the television, and the air conditioner along with operations to keep the devices silent, i.e., muting the television, reducing a speed of the air conditioner, and stopping the vacuum cleaner, to a user interface of a user mobile device. A similar example is shown in FIG. 3. Because the user wants to use the air conditioner, the user gives a voice command "Stop the vacuum cleaner and the television" or selects the vacuum cleaner and the television through a touch command on the user interface of the user mobile device. When receiving this confirmation, the virtual assistant device 107 stops the vacuum cleaner and the television with the air conditioner still running. This example relates to a situation in which multiple devices, i.e., the vacuum cleaner and the television, are controlled after receiving confirmation from the user via a user interface of an electronic device or a voice command.

Example 7: Consider a scenario in a living room where a user wants to listen to messages received on his or her mobile phone. In the living room, a vacuum cleaner, a television, and an air conditioner are operating, and there is a mobile phone of the user. In order to listen to the messages on the mobile phone without any interruption, the user gives a command "Hi Bixby! Keep silence. I want to hear messages." The virtual assistant device 107 of the disclosure identifies non-speech data, i.e., sounds of the vacuum cleaner, the television, and the air conditioner. The virtual assistant device 107 further identifies that keeping silence relates to all the devices in the living room except the mobile phone, i.e., the vacuum cleaner, the television, and the air conditioner because the messages are to be read from the mobile phone. In this situation, the virtual assistant device 107 presents a list of devices including the vacuum cleaner, the television, and the air conditioner along with operations to keep the devices silent, i.e., muting the television, reducing a speed of the air conditioner, and stopping the vacuum cleaner, to a user interface of a user mobile device. A similar example is shown in FIG. 3. Because the user wants to use the air conditioner and the vacuum cleaner, the user gives a voice command saying "Mute the television" or selects the television through a touch command on the user interface of the user mobile device. When receiving this confirmation, the virtual assistant device 107 stops the television with the air conditioner and the vacuum cleaner still running and plays the messages received on the mobile phone. This example relates to a situation in which one or more devices, i.e., the air conditioner, the vacuum cleaner, and the mobile phone, are controlled by resolving user command intent conflicts, i.e., avoiding muting the mobile phone along with the television.

The above examples may include an incomplete speech command without any mention of at least one target IoT device or may include a voice command of a user that lacks any target IoT device.

An embodiment of the disclosure may provide a command resolution method in an Internet of things (IoT) environment, the command resolution method including: receiving, by a virtual assistant device, a voice command from a user, wherein the voice command includes at least one IoT device control parameter; detecting, by the virtual assistant device, at least one non-speech sound while receiving the voice command; identifying, by the virtual assistant device, one or more IoT devices in the user's surroundings based on the detected at least one non-speech sound; selecting, by the virtual assistant device, at least one target IoT device from the identified one or more IoT devices, based on a correlation of a current operating state of each of the identified one or more IoT devices with the identified IoT device control parameter; and executing, by the virtual assistant device, the received IoT device control parameter on the selected at least one target IoT device.

An embodiment of the disclosure may provide a virtual assistant device for command resolution in an Internet of things (IoT) environment, the virtual assistant device including: a processor; and a memory communicatively coupled to the processor, wherein the processor is configured to execute instructions stored in the memory to: receive a voice command from a user, wherein the voice command includes at least one IoT device control parameter; detect at least one non-speech sound while receiving the voice command; identify one or more IoT devices in the user's surroundings based on the detected at least one non-speech sound; select at least one target IoT device from the identified one or more IoT devices, based on a correlation of a current operating state of each of the identified one or more IoT devices with the identified IoT device control parameter; and execute the received IoT device control parameter on the selected at least one target IoT device.

In an embodiment of the disclosure, processing of the voice command from the user and analyzing of the at least one non-speech sound may be performed in parallel.

In an embodiment of the disclosure, the analyzing of the at least one non-speech sound may be triggered according to detection of presence of the at least one IoT device control parameter in the voice command.

In an embodiment of the disclosure, the non-speech sound from the user's surroundings may include at least one of sounds related to operations of IoT devices in the user's surroundings or an ambient sound from the user's surroundings other than the sounds related to the operations of the IoT devices.

In an embodiment of the disclosure, the sounds related to the operations of the IoT devices and the ambient sound from the user's surroundings may be stored in a repository related to the virtual assistant device.

In an embodiment of the disclosure, each IoT device control parameter may be associated with the one or more IoT devices, wherein the association between the each IoT device control parameter and the one or more IoT devices is stored in the repository associated with the virtual assistant device.

In an embodiment of the disclosure, when a location of the virtual assistant device is fixed, the virtual assistant device may cause the processor to determine a location where the voice command of the user is received, to identify one or more IoT devices present in the vicinity of the location.

In an embodiment of the disclosure, when the location of the virtual assistant device is movable, the virtual assistant device may cause the processor to determine a position of the virtual assistant device in the IoT environment.

In an embodiment of the disclosure, when the position of the virtual assistant device is known, the virtual assistant device may cause the processor to detect one or more IoT devices present in the vicinity of the position of the virtual assistant device.

In an embodiment of the disclosure, when the position of the virtual assistant device is not known, the virtual assistant device may cause the processor to determine all IoT devices connected to the virtual assistant device.

In an embodiment of the disclosure, operating states of the identified one or more IoT devices may be received from the repository associated with the virtual assistant device, wherein the operating states of the identified one or more IoT devices are maintained in real time in the repository associated with the virtual assistant device.

In an embodiment of the disclosure, the voice command of the user may include an incomplete speech command from the user that does not mention the at least one target IoT device.

In an embodiment of the disclosure, controlling of an operation of the selected at least one target IoT device may include providing, by the virtual assistant device, a list of one or more target IoT devices to the user via an electronic device associated with the user, when more than one target IoT device is selected from the identified one or more IoT devices; receiving, by the virtual assistant device, an input from the user via the electronic device to control operations of the one or more target IoT devices, wherein the input from the user includes a selection of the one or more target IoT devices; and controlling, by the virtual assistant device, operations of the one or more target IoT device based on the user input.

In an embodiment of the disclosure, the at least one non-speech sound may be detected from the use's surroundings or from the virtual assistant device's surroundings.

In an embodiment of the disclosure, the executing of the identified IoT device control parameter on the selected at least one target IoT device may include, controlling, by the virtual assistant device, an operation of the selected at least one target IoT device to achieve command resolution based on the non-speech sound.

In an embodiment of the disclosure, the IoT device control parameter may include at least one of a command, a component type, or a target IoT device.

Figure 6:
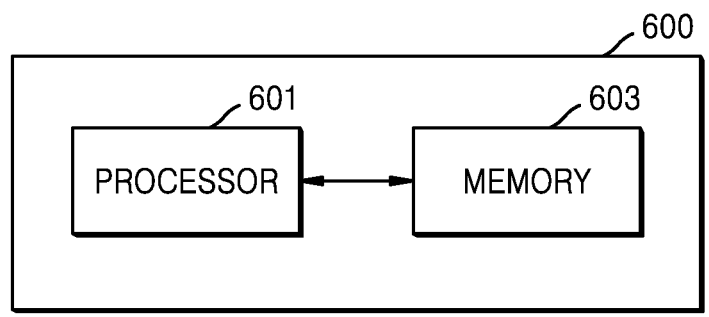
FIG. 6 is a block diagram illustrating a configuration of a voice command resolution apparatus according to an embodiment.

FIG. 6 is a block diagram illustrating a configuration of a voice command resolution apparatus according to an embodiment of the disclosure. Referring to FIG. 6, a voice command resolution apparatus 600 according to an embodiment of the disclosure may include a processor 601 and a memory 603 storing one or more instructions executable by the processor 601. One or more processors 601 may be provided. One or more memories 603 may be provided. An example of an operation of the voice command resolution apparatus 600 performed when the processor 601 executes the one or more instructions stored in the memory 603 will be described in detail below with reference to FIG. 7. The voice command resolution apparatus 600 may be the virtual assistant device 107 or a part of the virtual assistant device 107.

Figure 7:
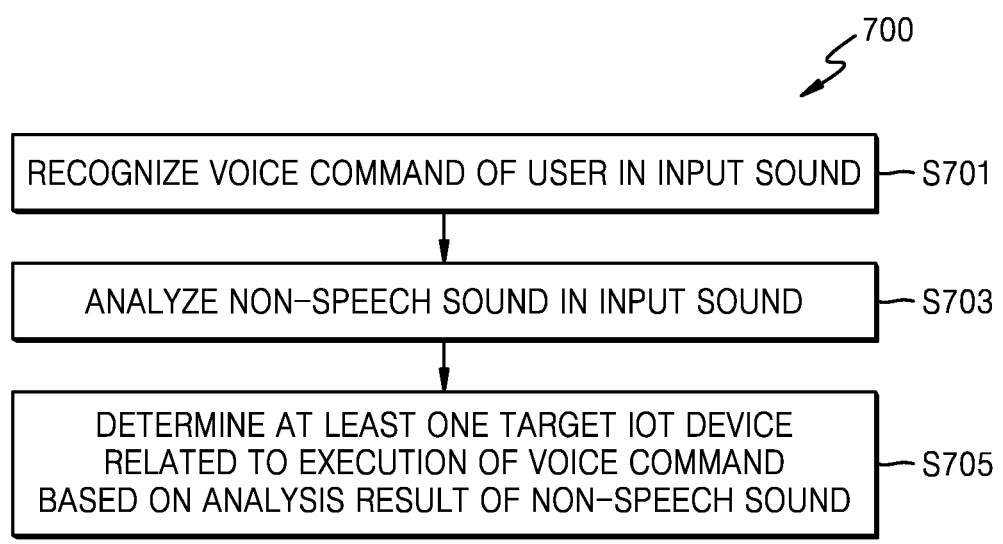
FIG. 7 is a flowchart illustrating a flow of an operating method of a voice command resolution apparatus based on a non-speech sound in an IoT environment according to an embodiment.

FIG. 7 is a flowchart illustrating a flow of an operating method of a voice command resolution apparatus based on a non-speech sound in an IoT environment according to an embodiment of the disclosure. Referring to FIG. 7, the processor 601 of the voice command resolution apparatus 600 may recognize a voice command of a user in an input sound in operation S701, and may analyze a non-speech sound in the input sound in operation S702. The non-speech sound may be a sound that is generated at the same time as or around the same time as the voice command. For example, the non-speech sound may be a sound generated within a certain period of time from a start point of time and/or an end point of time of the voice command.

Operation S701 in which the voice command is recognized and operation S702 in which the non-speech sound is analyzed may be performed in parallel or at the same time. When two operations are performed at the same time, it does not mean that the two operations have the same start point of time, but may mean that execution times of the two operations may overlap each other.

The processor 601 may determine at least one target IoT device related to execution of the voice command based on an analysis result of the non-speech sound in operation S703. The target IoT device is determined based on the analysis result of the non-speech sound, but does not necessarily need to be a device that is currently operating or making a sound. The processor 601 may determine the target IoT device based on a correlation between the analysis result of the non-speech sound and the voice command.

The processor 601 may execute the voice command on the determined target IoT device. The processor 601 may control the determined target IoT device to execute the voice command. The processor 601 may determine an operation to be performed by the target IoT device in relation to execution of the voice command, based on the analysis result of the non-speech sound, and may control the target IoT device to perform the operation. The processor 601 may determine an operation to be performed by the target IoT device based on the correlation between the analysis result of the non-speech sound and the voice command.

The processor 601 may analyze the non-speech sound when the recognized voice command is incomplete. The processor 601 may analyze the non-speech sound when the target IoT device of the voice command is not completely specified in the recognized voice command. The processor 601 may analyze the non-speech sound on the basis that the recognized voice command does not include at least one target IoT device required to execute the voice command. The processor 601 may analyze the non-speech sound only when the recognized voice command does not include at least one target IoT device required to execute the voice command.

The processor 601 may analyze the non-speech sound when the recognized voice command is complete. The processor 601 may analyze the non-speech sound even when the recognized voice command includes all target IoT devices required to execute the voice command. In this case, the processor 601 may cause a target IoT device determined based on the analysis result of the non-speech sound to perform an operation related to execution of the voice command.

The processor 601 may determine a plurality of target IoT devices related to execution of the voice command based on the analysis result of the non-speech sound. The processor 601 may determine operations to be performed by the determined plurality of target IoT devices in relation to execution of the voice command, based on the analysis result of the non-speech sound, and may control the plurality of target IoT devices to respectively perform the operations. The processor 601 may control the plurality of target IoT devices to simultaneously perform the operations to be performed in relation to execution of the voice command.

When analyzing the non-speech sound, the processor 601 may compare the non-speech sound with pre-defined sounds of IoT devices. The processor 601 may determine one or more IoT devices that are currently operating around by comparing the non-speech sound with the pre-defined sounds of the IoT devices. The processor 601 may determine at least one of the IoT devices that are currently operating around as a target IoT device. The processor 601 may determine a device other than an IoT device that is currently operating around as a target IoT device, based on the IoT devices that are currently operating around. The processor 601 may determine an operation to be performed by the target IoT device based on the IoT devices that are currently operating around. The IoT device that is currently operating around may be an IoT device that is making a sound.

When analyzing the non-speech sound, the processor 601 may detect an ambient sound other than a sound related to an operation of an IoT device from the non-speech sound. The processor 601 may determine a target IoT device based on the detected ambient sound. The processor 601 may determine an operation to be performed by the target IoT device based on the detected ambient sound.

Figure 8:
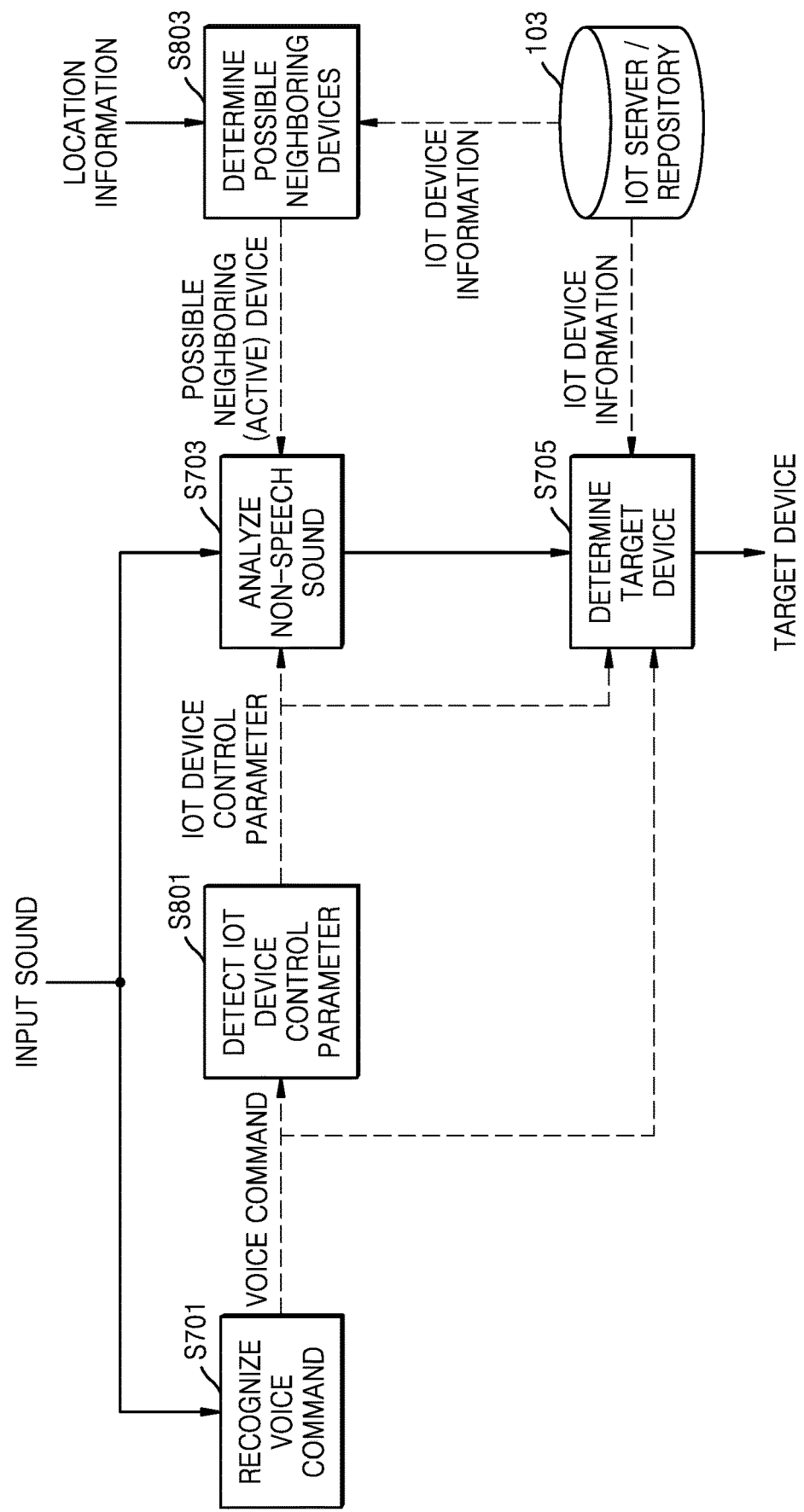
FIG. 8 is a detailed flowchart illustrating a flow of an operating method of a voice command resolution apparatus based on a non-speech sound in an IoT environment according to an embodiment.

FIG. 8 is a detailed flowchart illustrating a flow of an operating method of a voice command resolution apparatus based on a non-speech sound in an IoT environment according to an embodiment of the disclosure. Operations such as operation S701, operation S703, and operation S705 may correspond to similar operations described above with respect to FIG. 7, and duplicate description of these operations has been omitted.

Referring to FIG. 8, the processor 601 may detect an IoT device control parameter in a voice command, for example a voice command hypothesis, in operation S801. The processor 601 may analyze a non-speech sound based on the detected IoT device control parameter. The IoT device control parameter may be directly included in the voice command, or may be extracted by analyzing the voice command. For example, when a user's voice command is "Hi Bixby! Keep silence", "silence" included in the voice command may be detected as a control parameter, and when the user's voice command is "Hi Bixby! Too loud", "silence" may be extracted as a control parameter by analyzing the voice command.

The processor 601 may analyze the non-speech sound on the basis that the IoT device control parameter is detected in the voice command. The processor 601 may analyze the non-speech sound only when the IoT device control parameter is detected in the voice command. The processor 601 may analyze the non-speech sound when a target IoT device for an operation related to the IoT device control parameter is not completely specified in the voice command. The processor 601 may analyze the non-speech sound when the recognized voice command does not include at least one target IoT device required to perform the operation related to the detected IoT device control parameter. The processor 601 may analyze the non-speech sound when the IoT device control parameter is not detected in the voice command.

The processor 601 may analyze the non-speech sound based on one or more IoT devices that are pre-matched to the detected IoT device control parameter. For example, when comparing the non-speech sound with pre-defined sounds of IoT devices, the processor 601 may compare the non-speech sound only with pre-defined sounds of the IoT devices that are pre-matched to the detected IoT device control parameter, thereby greatly reducing computational resources and increasing a processing speed.

The processor 601 may select at least one filter bank to be used to analyze the non-speech sound based on the detected IoT device control parameter. Accordingly, computational resources may be reduced and a processing speed may be increased. The filter bank may be for example a Mel filter bank.

The processor 601 may determine a target IoT device and/or an operation to be performed by the target IoT device based on a correlation of at least two of the recognized voice command, the detected IoT device control parameter, an analysis result of the non-speech sound, or IoT device information received from the repository 103 associated with the voice command resolution apparatus 600. The repository 103 may be an IoT server, or a database associated with the IoT server. The processor 601 may determine a target IoT device and/or an operation to be performed by the target IoT device based on a correlation between the detected IoT device control parameter and the analysis result of the non-speech sound. The processor 601 may determine a target IoT device and/or an operation to be performed by the target IoT device based on a correlation between the detected IoT device control parameter, the analysis result of the non-speech sound, and the IoT device information received from the repository 103.

The processor 601 may determine one or more possible neighboring IoT devices, for example one or more IoT devices that may exist in the area of the voice command resolution apparatus 600 or the area of the user who gives the voice command, and may analyze the non-speech sound based on the one or more possible neighboring IoT devices. The processor 601 may consider only the IoT devices that may exist around the voice command resolution apparatus 600 or the user who gives the voice command, instead of all IoT devices within an IoT service, thereby reducing computational resources and increasing a processing speed. For example, when comparing the non-speech sound with predefined sounds of IoT devices, the processor 601 may compare the non-speech sound only with pre-defined sounds for the one or more possible neighboring IoT devices, thereby greatly reducing computational resources and increasing a processing speed. The processor 601 may determine the one or more possible neighboring IoT devices based on the non-speech sound. The one or more possible neighboring IoT devices may be devices that are currently operating or making a sound. The one or more possible neighboring IoT devices may not be devices that are currently operating or making a sound.

In operation S803, the processor 601 may determine the one or more possible neighboring IoT devices based on location information. The location information may be information on a location of the voice command resolution apparatus 600 and/or a location of the user who gives the voice command.

The processor 601 may determine the one or more possible neighboring IoT devices based on the location of the voice command resolution apparatus 600. The location of the voice command resolution apparatus 600 may include a location of a microphone that receives an input sound.

The processor 601 may determine the one or more possible neighboring IoT devices based on the location of the user who gives the voice command. The location of the user may be determined based on the location of the voice command resolution apparatus 600. The location of the user may be determined based on a direction in which the voice command of the user is heard by using beamforming or the like. The processor 601 may determine the location of the user based on the non-speech sound heard in the direction in which the voice command of the user is heard. The processor 601 may determine the one or more possible neighboring IoT devices based on a direction in which the non-speech sound is heard. Although the description will focus on the location of the voice command resolution apparatus 600, the description may also apply to the location of the user who gives the voice command.

When the voice command resolution apparatus 600 is a movable device, the voice command resolution apparatus 600 may determine its own location by using any indoor/outdoor positioning technology or IoT service. The voice command resolution apparatus 600 may determine its own location based on the non-speech sound. When the voice command resolution apparatus 600 is a fixed device, a location of the voice command resolution apparatus 600 may be designated by the user. For example, the user may designate fixed IoT devices, for example a television, an air conditioner, a refrigerator, and a virtual assistant device, installed in each place, for example a living room, a room, or a kitchen, by using a user interface (UI) of the IoT service. Even when the voice command resolution apparatus 600 is a fixed device, the voice command resolution apparatus 600 may determine its own location based on the positioning technology, the IoT service, the non-speech sound, or the like.

When the location of the voice command resolution apparatus 600 is known, the processor 601 may determine fixed IoT devices that exist around the voice command resolution apparatus 600 as the one or more possible neighboring IoT devices. The processor 601 may determine all movable IoT devices within the IoT service as the one or more possible neighboring IoT devices. The processor 601 may determine devices whose location is not known as not being around the voice command resolution apparatus 600 from among the movable IoT devices within the IoT service as the one or more possible neighboring IoT devices. The processor 601 may determine all IoT devices that are within the IoT service and whose location within the IoT service is not known as the one or more possible neighboring IoT devices. A case where the location of the voice command resolution apparatus 600 is known may include a case where the voice command resolution apparatus 600 is a fixed device. In addition, a case where the location of the voice command resolution apparatus 600 is known may include a case where the voice command resolution apparatus 600 is a movable device and its location is determined.

When the location of the voice command resolution apparatus 600 is not known, the processor 601 may determine all IoT devices within the IoT service as the one or more possible neighboring IoT devices. A case where the location of the voice command resolution apparatus 600 is not known may include a case where the voice command resolution apparatus 600 is a movable device and its location is not determined.

The processor 601 may determine the one or more possible neighboring IoT devices based on the IoT device information, for example a location of an IoT device or an operating state of the IoT device, received from the repository 103. The processor 601 may determine one or more possible neighboring active IoT devices, i.e., one or more operating IoT devices that may exist around, based on the IoT device information received from the repository 103. The processor 601 may determine the one or more possible neighboring active IoT devices based on the location of the voice command resolution apparatus 600 and the IoT device information received from the repository 103.

The processor 601 may analyze the non-speech sound based on the possible neighboring active IoT devices. The processor 601 may determine one or more active IoT devices that exist around the voice command resolution apparatus 600, that is, IoT devices that are actually currently operating around the voice command resolution apparatus 600 or the user who gives the voice command, based on the one or more possible neighboring active IoT devices and the non-speech sound.

The analysis result of the non-speech sound may include the one or more possible neighboring IoT devices, the one or more possible neighboring active IoT devices, or the one or more active IoT devices that exist around the voice command resolution apparatus 600 or the user who gives the voice command. The processor 601 may determine a target IoT device based on the one or more possible neighboring IoT devices, the one or more possible neighboring active IoT devices, or the one or more active IoT devices that exist around the voice command resolution apparatus 600 or the user who gives the voice command. The processor 601 may determine a target IoT device and/or an operation to be performed by the target IoT device based on a correlation between the one or more possible neighboring IoT devices, the one or more possible neighboring active IoT devices, or the one or more active IoT devices that exist around the voice command resolution apparatus 600 or the user who gives the voice command, the recognized voice command, the detected IoT device control parameter, the analysis result of the non-speech sound, or the IoT device information received from the repository 103.

The processor 601 may determine at least one of the one or more possible neighboring IoT devices as the target IoT device. The processor 601 may determine at least one of the one or more possible neighboring active IoT devices as the target IoT device. The processor 601 may determine at least one of the one or more active IoT devices that exist around the voice command resolution apparatus 600 or the user who gives the voice command as the target IoT device.

The processor 601 may receive operating states of the one or more possible neighboring IoT devices from the repository 103. The processor 601 may determine a target IoT device and/or an operation to be performed by the target IoT device based on a correlation between an operating state of at least one IoT device that may exist around received from the repository 103, and the detected IoT device control parameter.

In an embodiment of the disclosure, the processor 601 may determine the one or more possible neighboring active IoT devices based on the location of the voice command resolution apparatus 600 and the IoT device information received from the repository 103, may determine the one or more active IoT devices that exist around the voice command resolution apparatus 600 or the user who gives the voice command based on the one or more possible neighboring active IoT devices and the non-speech sound, and may determine at least one target IoT device related to execution of the voice command based on the one or more active IoT devices that exist around the voice command resolution apparatus 600 or the user who gives the voice command. The processor 601 may determine a target IoT device and/or an operation to be performed by the target IoT device based on a correlation between the one or more active IoT devices that exist around the voice command resolution apparatus 600 or the user who gives the voice command, and the recognized voice command or the detected IoT device control parameter. The processor 601 may determine a target IoT device and/or an operation to be performed by the target IoT device based on a correlation between the one or more active IoT devices that exist around the voice command resolution apparatus 600 or the user who gives the voice command, the recognized voice command or the detected IoT device control parameter, and the IoT device information received from the repository 103. The determined target IoT device may be one of the one or more active IoT devices that exist around the voice command resolution apparatus 600 or the user who gives the voice command. The determined target IoT device may not be one of the one or more active IoT devices that exist around the voice command resolution apparatus 600 or the user who gives the voice command, but may be a device related to execution of the recognized voice command.

In an embodiment of the disclosure, the processor 601 may determine the location of the voice command resolution apparatus 600 based on the non-speech sound, and may determine at least one target IoT device related to execution of the voice command based on the determined location of the voice command resolution apparatus 600.

Figure 9:
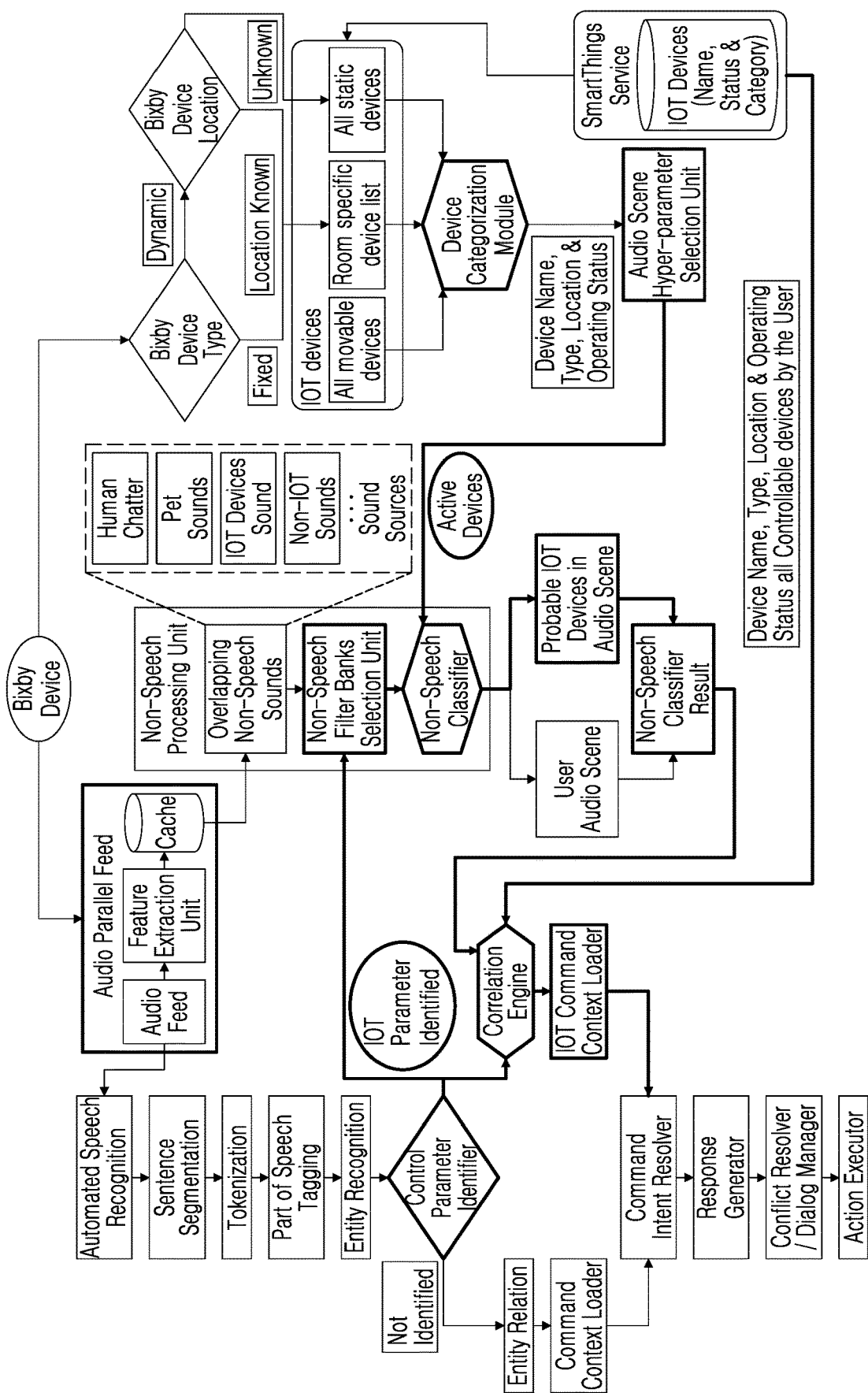
FIG. 9 is a detailed flowchart illustrating a flow of an operating method of a voice command resolution apparatus based on a non-speech sound in an IoT environment according to an embodiment.

FIG. 9 is a detailed flowchart illustrating a flow of an operating method of a voice command resolution apparatus based on a non-speech sound in an IoT environment according to an embodiment of the disclosure.

Some advantages of the disclosure are as follows.

An embodiment of the disclosure provides an efficient command resolution method based on a non-speech sound in an IoT environment in addition to a voice command of a user.

An embodiment of the disclosure provides a method that may understand an incomplete voice command from a user.

An embodiment of the disclosure uses operating states of one or more IoT devices identified by a non-speech sound classifier unit to more accurately select one or more IoT devices.

An embodiment of the disclosure allows users to not to remember complete and exact commands for performing tasks to reduce cognitive overload on the users.

The proposed method may improve end-user experience and thus, increase user reliability on artificial intelligence (AI) assistants.

Embodiments of the disclosure may be implemented as computer-executable code stored in a computer-readable recording medium. Examples of the computer-readable recording medium include all recording media such as a magnetic medium, an optical medium, read-only memory (ROM), and random-access memory (RAM). The computer-readable recording medium may be provided as a non-transitory storage medium. Here, 'non-transitory' means that the storage medium does not include a signal and is tangible, but does not distinguish whether data is stored semi-permanently or temporarily on the storage medium. For example, the 'non-transitory storage medium' may include a buffer in which data is temporarily stored.

According to an embodiment of the disclosure, methods according to various embodiments of the disclosure may be provided in a computer program product. The computer program product is a product purchasable between a seller and a purchaser. The computer program product may be stored and distributed in a computer-readable recording medium, or may be distributed (e.g., downloaded or uploaded) online via an application store (e.g., Play Store™) or between two user devices (e.g., smartphones) directly. When distributed online, at least a part of the computer program product (e.g., a downloadable application) may be temporarily generated or at least temporarily stored in a computer-readable recording medium such as a memory of a manufacturer's server, a server of the application store, or a relay server.

Also, the term "unit" used herein may be a hardware component such as a processor or a circuit and/or a software component executed by a hardware component such as a processor.

Also, throughout the disclosure, the expression "at least one of a, b, or c" indicates only a, only b, only c, both a and b, both a and c, both b and c, all of a, b, and c, or variations thereof.

Artificial intelligence (AI)-related functions according to the disclosure are performed by a processor and a memory. A processor may include one or more processors. In this case, the one or more processors may include a general-purpose processor such as a central processing unit (CPU), an application processor (AP), or a digital signal processor (DSP), a graphics processor such as a graphics processing unit (GPU) or a vision processing unit (VPU), or an AI processor such as a neural processing unit (NPU). The one or more processors control input data to be processed according to a pre-defined operation rule or an AI model stored in the memory. In embodiments, when the one or more processors are AI processors, the AI processors may be designed in a hardware structure specialized for processing a specific AI model.

The pre-defined operation rule or the AI model may be created through learning. Here, "created through learning" means that, as a basic AI model is trained by using a plurality of pieces of training data according to a learning algorithm, a pre-defined operation rule or an AI model set to perform desired characteristics (or purpose) is created. Such learning may be performed on a device in which an AI-based voice command resolution method according to the disclosure is conducted or may be performed through a separate server and/or system. Examples of the learning algorithm include, but are not limited to, supervised learning, unsupervised learning, semi-supervised learning, or reinforcement learning.

An AI model may include a plurality of neural network layers. Each of the plurality of neural network layers has a plurality of weight values, and a neural network operation is performed through an operation between an operation result of a previous layer and the plurality of weight values. The weight values of the neural network layers may be optimized through a learning result of the AI model. For example, the plurality of weight values may be renewed to reduce or optimize a loss value or a cost value obtained by the AI model during a learning process. An artificial neural network may include a deep neural network (DNN), for example, a convolutional neural network (CNN), a recurrent neural network (RNN), a restricted Boltzmann machine (RBM), a deep belief network (DBN), a bidirectional recurrent deep neural network (BRDNN), or a deep Q-network, but is not limited thereto.

While the disclosure has been particularly shown and described with reference to embodiments thereof, the embodiments are non-limiting examples of the disclosure, and should be considered in a descriptive sense only and not for purposes of limitation. It will be understood by one of ordinary skill in the art that the embodiments of the disclosure may be easily modified in other specific forms all without changing the technical spirit or the essential features of the disclosure. For example, each component described as a single type may be executed in a distributed manner, and components described as a distributed type may be executed in a combined type. While the disclosure has been described by using specific terms, the terms have merely been used to explain the disclosure and should not be construed as limiting the concept or scope of the disclosure as defined by the claims.

The scope of the disclosure is indicated by the claims rather than by the detailed description of the disclosure, and it should be understood that the claims and all modifications or modified forms drawn from the concept and scope of the claims and equivalents are included in the scope of the disclosure. Additionally, it is intended that such equivalents include both currently known equivalents and equivalents to be developed in the future, i.e., any elements developed to perform the same function, regardless of structure.

What is claimed is:

1. A voice command resolution apparatus comprising:
   a memory configured to store instructions; and
   a processor configured to execute the instructions to:
      receive a voice command through an input/output interface of the voice command resolution apparatus, wherein the voice command includes at least one IoT device control parameter;
      identify at least one non-speech sound while receiving the voice command through the input/output interface;
      determine a location of the voice command resolution apparatus;
      identify, at least one IoT device present in a vicinity of the determined location of the voice command resolution apparatus;
      determine at least one target IoT device from the identified at least one IoT device based on operating states of the identified at least one IoT device, the identified at least one non-speech sound and the at least one IoT device control parameter; and
      control an operation of the determined at least one target IoT device to execute the at least one IoT device control parameter.

2. The voice command resolution apparatus of claim 1, wherein the processor is further configured to execute the instructions to analyze the at least one non-speech sound when the received voice command does not include information related to at least one target IoT device.

3. The voice command resolution apparatus of claim 1, wherein the processor is further configured to execute the instructions to determine an operation to be performed by the determined at least one target IoT device based on operating states of the identified at least one IoT device and the at least one IoT device control parameter.

4. The voice command resolution apparatus of claim 1, wherein the processor is further configured to execute the instructions to identify, as the at least one IoT device, all IoT device connected to the voice command resolution apparatus, except for the cases where the determined location of the voice command resolution apparatus is known.

5. The voice command resolution apparatus of claim 1, wherein the processor is further configured to execute the instructions to identify at least one IoT device present in the vicinity of the determined location of the voice command resolution apparatus when the voice command resolution apparatus is a fixed device.

6. The voice command resolution apparatus of claim 1, wherein the processor is further configured to execute the instructions to identify at least one IoT device present in the vicinity of the determined location of the voice command resolution apparatus when the voice command resolution apparatus is a mobile device and the determined location of the voice command resolution apparatus is known.

7. The voice command resolution apparatus of claim 1, wherein the processor is further configured to execute the instructions to:
   provide a list including the identified at least one target IoT device via the input/output interface;
   receive a user input for selecting a target IoT device from the identified at least one target IoT device via the input/output interface; and
   select the target IoT device from the identified at least one target IoT device based on the received user input,
   wherein the operating states of the identified target IoT device corresponds to an operation of the selected target IoT device.

8. The voice command resolution apparatus of claim 1, wherein the processor is further configured to execute the instructions to identify the at least one IoT device by comparing the identified at least one non-speech sound with pre-defined sounds of the IoT devices.

9. The voice command resolution apparatus of claim 1, wherein the processor is further configured to execute the instructions to identify an ambient sound that is not related to the operations of the at least one IoT device from the at least one non-speech sound.

10. The voice command resolution apparatus of claim 1, wherein the processor is further configured to execute the instructions to analyze the at least one non-speech sound based at least one IoT device that is pre-matched to the at least one IoT device control parameter included in the voice command.

11. The voice command resolution apparatus of claim 1, wherein the processor is further configured to execute the instructions to receive information related to the at least one IoT device from a repository associated with the voice command resolution apparatus.

12. An operating method of a voice command resolution apparatus, the operating method comprising:
- receiving a voice command through an input/output interface of the voice command resolution apparatus, wherein the voice command includes at least one IoT device control parameter;
- identifying at least one non-speech sound while receiving the voice command through the input/output interface;
- determining a location of the voice command resolution apparatus;
- identifying, at least one IoT device present in a vicinity of the determined location of the voice command resolution apparatus;
- determining at least one target IoT device from the identified at least one IoT device based on operating states of the identified at least one IoT device, the identified at least one non-speech sound and the at least one IoT device control parameter; and
- controlling an operation of the determined at least one target IoT device to execute the at least one IoT device control parameter.

13. The operating method of claim 12, further comprising:
analyzing the non-speech sound when the received voice command does not include information related to at least one target IoT device.

14. The operating method of claim 12, further comprising:
determining an operation to be performed by the determined at least one target IoT device based on operating states of the identified at least one IoT device and the at least one IoT device control parameter.

15. The operating method of claim 12, further comprising:
identifying, as the at least one IoT device, all IoT device connected to the voice command resolution apparatus, except for the cases where determined the location of the voice command resolution apparatus is known.

16. The operating method of claim 12, further comprising:
identifying at least one IoT device present in the vicinity of the determined location of the voice command resolution apparatus when the voice command resolution apparatus is a fixed device.

17. The operating method of claim 12, further comprising:
identifying at least one IoT device present in the vicinity of the determined location of the voice command resolution apparatus when the voice command resolution apparatus is a mobile device and the determined location of the voice command resolution apparatus is known.

18. The operating method of claim 12, further comprising:
- providing a list including the identified at least one target IoT device via the input/output interface;
- receiving a user input for selecting a target IoT device from the identified at least one target IoT device via the input/output interface; and
- selecting the target IoT device from the identified at least one target IoT device based on the received user input,
- wherein the operating states of the identified target IoT device corresponds to an operation of the selected target IoT device.

19. The operating method of claim 11, further comprising:
identifying the at least one IoT device by comparing the identified at least one non-speech sound with predefined sounds of the IoT devices.

20. A non-transitory computer-readable recording medium having recorded thereon instructions which, when executed by at least one processor, cause the at least one processor to:
- receive the voice command through an input/output interface of the voice command resolution apparatus, wherein the voice command includes at least one IoT device control parameter;
- identify at least one non-speech sound while receiving the voice command through the input/output interface;
- determine a location of the voice command resolution apparatus;
- identify, at least one IoT device present in a vicinity of the determined location of the voice command resolution apparatus;
- determine at least one target IoT device from the identified at least one IoT device based on operating states of the identified at least one IoT device, the identified at least one non-speech sound and the at least one IoT device control parameter; and
- control an operation of the determined at least one target IoT device to execute the at least one IoT device control parameter.

* * * * *